(12) United States Patent
Schmitt

(10) Patent No.: US 6,614,992 B2
(45) Date of Patent: Sep. 2, 2003

(54) HEATING PANEL HAVING HEAT CONDUCTING BEAM AND HEATING CABLE MOUNTED THEREIN

(76) Inventor: Robert D. Schmitt, 5995 S. Bannock St., Littleton, CO (US) 80120

(*) Notice: Subject to any disclaimer, the term of this patent is extended or adjusted under 35 U.S.C. 154(b) by 0 days.

(21) Appl. No.: 09/799,307

(22) Filed: Mar. 5, 2001

(65) Prior Publication Data

US 2001/0026681 A1 Oct. 4, 2001

Related U.S. Application Data

(60) Provisional application No. 60/186,601, filed on Mar. 3, 2000.

(51) Int. Cl.$^7$ .................................................. H05B 3/28
(52) U.S. Cl. ........................................ 392/435; 219/213
(58) Field of Search ............................... 392/435–437, 392/432; 219/213, 544; 297/180.12; 52/182, 184

(56) References Cited

U.S. PATENT DOCUMENTS

| | | | |
|---|---|---|---|
| 2,522,841 A | * 9/1950 | Ross | ........................... 392/435 |
| 2,816,201 A | 12/1957 | Mulvey | |
| 2,912,555 A | 11/1959 | Jamison | |
| 3,467,220 A | * 9/1969 | Smith et al. | ................... 52/182 |
| 4,225,774 A | * 9/1980 | Taberman | ................... 219/217 |
| 4,310,745 A | 1/1982 | Bender | |
| 4,733,057 A | 3/1988 | Stanzel et al. | |
| 4,948,943 A | 8/1990 | Bruckner | |
| 4,952,775 A | 8/1990 | Yokoyama et al. | |
| 5,237,155 A | 8/1993 | Hill | |
| 5,614,292 A | 3/1997 | Saylor | |
| 2001/0000841 A1 | * 5/2001 | Birch et al. | ................... 52/182 |
| 2002/0136543 A1 | * 9/2002 | Thorin | ........................ 392/435 |

FOREIGN PATENT DOCUMENTS

| | | | | |
|---|---|---|---|---|
| DE | 2445719 | * | 4/1976 | ................. 219/213 |
| GB | 870490 | * | 6/1961 | ................. 219/213 |
| GB | 942327 | * | 11/1963 | ................. 219/213 |
| GB | 964174 | * | 7/1964 | ................. 219/213 |
| GB | 1396723 | * | 6/1975 | ................. 392/435 |
| JP | 2-213081 | * | 8/1980 | ................. 392/435 |
| JP | 2-143032 | * | 6/1990 | ................. 219/213 |
| WO | 9941551 | * | 8/1999 | |

* cited by examiner

Primary Examiner—John A. Jeffery
(74) Attorney, Agent, or Firm—Brian D. Smith, P.C.

(57) ABSTRACT

A heated platform is formed by one or more elongated boards or planks, each having an elongated lower surface with a pair of spaced-apart longitudinally extending channels defined therein. An elongated heat conducting metal beam is operatively mounted in heat conducting relation in each channel. The beam defines a central, wide, inner channel opening in one direction and a pair of narrower side cable channels one on each side of the central channel and opening in a direction opposite to the direction of opening of the inner channel. An electric heating cable is operatively mounted in heat conducting relation in the beam cable channels for supplying heat to the beam for transfer to the board or plank. The heated planks or boards are useful particularly for forming decks and seating for hot tubs, as well as for walkways and stairs.

17 Claims, 2 Drawing Sheets

HEATING PANEL HAVING HEAT CONDUCTING BEAM AND HEATING CABLE MOUNTED THEREIN

CROSS-REFERENCE TO RELATED APPLICATIONS

This application is a nonprovisional application claiming the benefit under 35 USC 119(e) of U.S. provisional application Ser. No. 60/186,601, filed on Mar. 3, 2000.

BACKGROUND OF THE INVENTION

1. Field of the Invention

The present invention relates to heated panels such as heated planks and boards. More specifically, the present invention relates to improve heated planks or boards for forming walkways, decks, platforms, seats, benches and the like for use in ice and snow conditions.

2. Description of the Prior Art

A plastic plate with an embedded heating element is shown in U.S. Pat. No. 5,550,350. Metal foil covers the bottom of the plate to increase the heat transfer from the heating element to the plate. The patent describes the heating element as a self-regulating pipe heating cable such as shown in U.S. Pat. No. 4,967,057. The cable has a flat oval cross-section and includes an electrically insulating outer sheath enclosing two uniformly spaced parallel electric wires. An electrically resistive heating material which changes in conductivity with changes in the temperature encloses the wires within the sheath.

U.S. Pat. No. 4,733,057 discloses polymeric strips each defining a groove in its lower face with a heating element or cable in the groove and the lower face and cable covered by aluminum foil. The strips are hinged together by plastic tape and are used to provide a floor or wall covering.

An electrically heated plank is shown in U.S. Pat. No. 2,816,201. The plank is used for melting snow and ice on platforms, driveways and walkways. The plank is formed as a rectangular, hollow, metal body with an electric heating element disposed within the body.

OBJECTS OF THE INVENTION

It is the principal object of the present invention to provide an improved heated plank or board for forming decks, platforms, walkways, benches, and the like.

Another object of the invention is to provide a plank or board construction of the foregoing character with improved heating capabilities.

A further object of the present invention is to provide a plank or board of the foregoing character which is simple in construction and sufficiently rugged for use as platforms, walkways and like high traffic applications.

Still another object of the present invention is to provide an improved heated plank or board of the foregoing character which is particularly suitable for use in construction of decks platforms, and benches for hot tubs.

SUMMARY OF THE INVENTION

A heating panel embodying the present invention is formed by one or more heated elongated planks or boards, having an elongated heat conducting beam operatively connected in heat transfer relation on the bottom thereof, and a heating cable mounted in heat transfer relation with the beam for applying heat thereto for transfer to the plank or board.

More specifically, the heated plank has an elongated lower surface defining a pair of spaced apart longitudinally extending channels. An elongated heat conducting beam is operatively mounted in heat conducting relation in each channel. The beam defines a central, wide, inner channel opening in one direction and a pair of narrower side cable channels one on each side of the central or inner channel and opening in a direction opposite to the direction of opening of the central channel. An electric heating cable is operatively mounted in heat conducting relation in the beam cable channels for supplying heat to the beam for transfer to the plank or board.

DESCRIPTION OF THE PREFERRED EMBODIMENT

Figure 1:
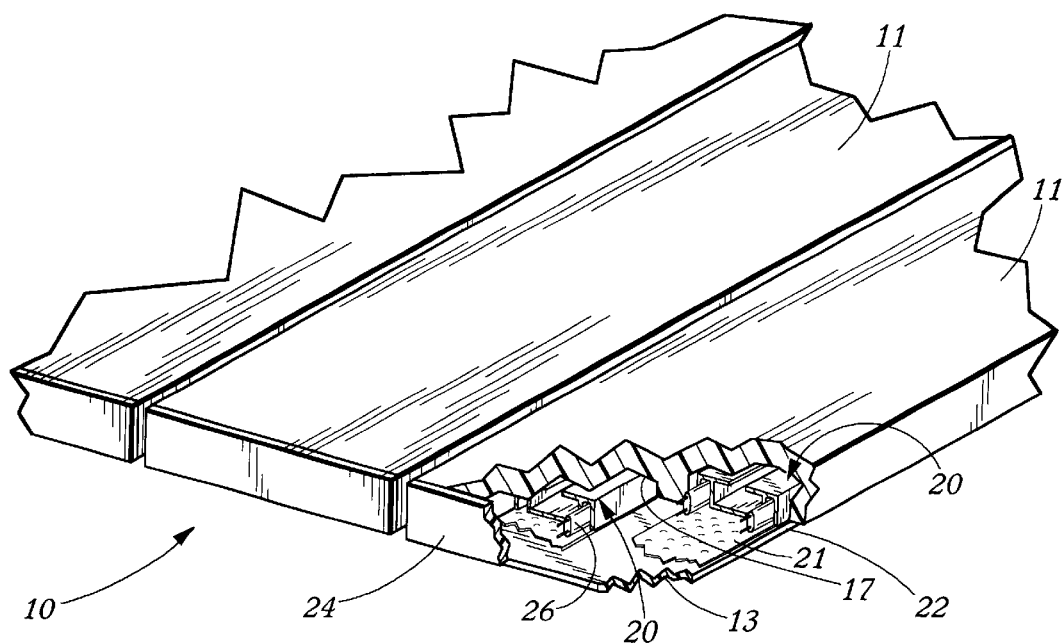
FIG. 1 is a perspective view, with portions cut away for clarity of a platform constructed of heated planks embodying the present invention.
Figure 2:
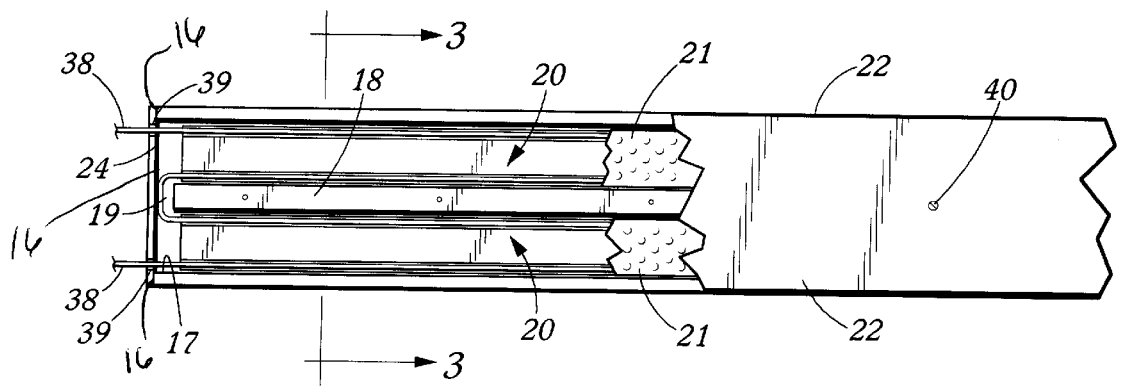
FIG. 2 is a bottom plan view of one of the planks embodying the present invention, with a portion cut away for clarity.

The present invention is embodied in a heated plank or board panel assembly 10, as shown in detail in the drawings and adapted for forming a deck, platform, seat, bench, or the like, as shown in FIG. 1. The invention finds particular but not exclusive utility for forming a deck or bench adjacent a hot tub in order to melt snow or ice adjacent to the tub thereby increasing the safety and comfort of the tub user.

The invention preferably utilizes boards or planks 11 made from wood substitute material such as polymeric materials, or polymer and wood particle containing matrix materials. The board 11 is rigid and formed of a material of the foregoing character which has heat conducting capability and is resistant to deterioration from exposure to heat, moisture and sunlight. Illustrative useful materials are commercially available under such trademarks as Envirowood, a material formed of recycled plastic, and Trek, a composite material of wood particles in a plastic binder. The boards or planks 11 may be in any conventional dimension suitable for construction, preferably 2 by 6 lumber.

The board 11 has an elongated upper surface 12, an elongated lower surface 13, and opposed elongated side walls 14, 15 joining the upper and lower surfaces 12, 13. In addition, surfaces 12, 13 and side walls 14, 15 terminate at each end 16 of the board 11. The board 11 also defines one or more elongated channels or grooves 17 cut or formed into its lower surface 13 for receiving elongated heating units 20. The channel or channels 17 may open into the ends 16 of the board 11. Two or more channels are separated by an elongated wall or walls 18, and are joined by a transverse channel 19 at one or both ends. When the heating units 20 are in place in the channels 17 they are each covered by an elongated insulating strip 21 formed of heat resistant insulating material. The bottom surface 13 of the board, the heating units 20, and the insulating strips 21 are covered by an elongated bottom cover panel 22 and the ends 16 are covered by an end panel 24.

Figure 3:
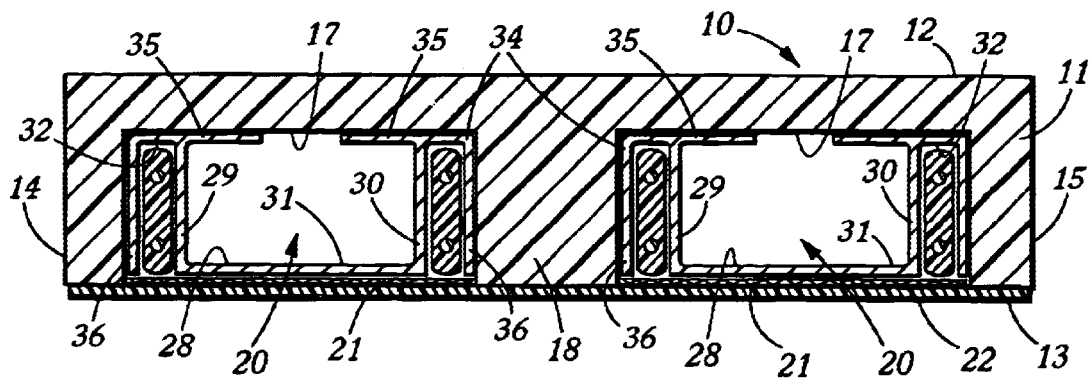
FIG. 3 is a section view taken substantially in the plane of line 3—3 on FIG. 2.
Figure 4:
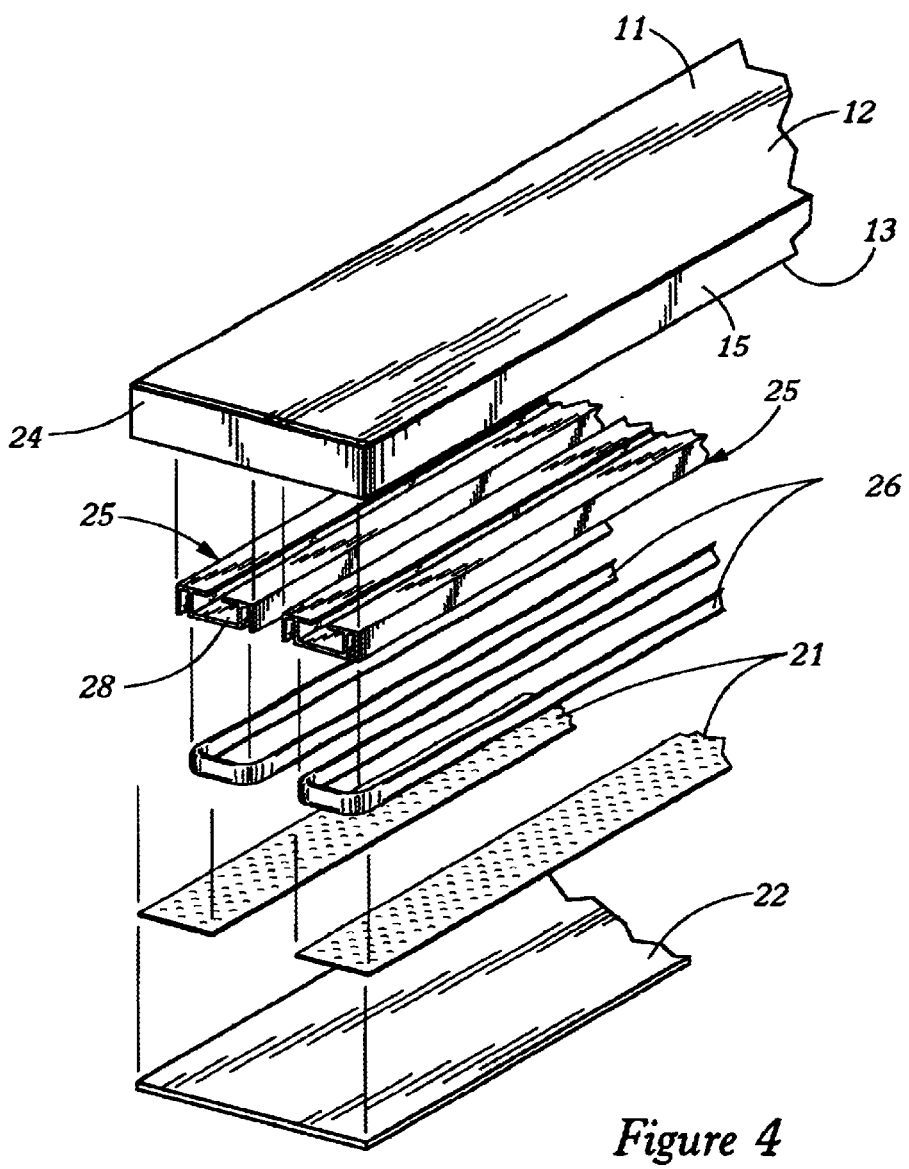
FIG. 4 is an exploded view of a portion of a heated plank embodying the present invention.

The heating units 20 are elongated, heat transfer channel extrusions 25, formed of highly heat conductive material such as aluminum or an aluminum alloy, for supporting heating cables or strips 26. The heat transfer channel extrusions 25, as shown particularly in FIGS. 3 and 4, are preferably each formed as an elongated extrusion defining a central, upwardly directed, U-shaped channel 28 formed by opposed upwardly extending spaced-apart, elongated side walls 29, 30 joined by an elongated bottom wall 31. Narrow, longitudinally extending, cable receiving side channels or slots 32 are formed on the outer side of each of the side walls 30, 31 by a pair of inverted L-shaped longitudinally extending angles 34 each defining a horizontal arm or fin 35 and a depending arm or wall 36 normal thereto. Each horizontal arm 35 is integral along a line intermediate its longitudinal edges with the upper end of a corresponding side wall 29, 30 of the inner central channel 28, while the depending arm 36 is positioned in spaced parallel relation with the outer surface of said inner channel side walls 29, 30, thereby defining slots 32 on each side of the inner channel 28 for receiving the heating cable 26. The horizontal arms 35 extend over the inner channel 28 in substantial but not complete covering relationship therewith, and provide for heat transfer contact with the inner surface of each channel or groove 17 defined in the board or plank 11. In this manner heat is effectively conducted from the heating cable 26 to the plank or board 11 for heating the same.

The heating cable 26 is a conventional, commercial electric cable commonly utilized for heating roofs, gutters, downspouts, pipes and the like. Such cables are readily available on the market and are suitable for use with both 110 v. and 220 v. power supplies. An extension cable or cables 38 extends from one end of the heating cable and is provided at its free end with a plug (not shown) adapted to be received in an appropriate electric receptacle (not shown). One commercially available electric cable is a self regulating heat cable produced by Thermon Commercial Products Division under the trademark RGS. Other electric heating cables are described in the patents referred to above. The electric cables may be of the self-regulating type or an appropriate thermostat or control (not shown) may be utilized.

The heated boards 11 are produced or assembled by cutting appropriate grooves or channels 17 in one surface of the plank. The heating cable 26 is inserted into the aluminum heat transfer extrusion 25 and the extrusion and cable assembly is mounted in the grooves or channels 17 in the board 11. Insulating covers or strips 21 are provided over each channel 17 and a bottom surface cover panel 22 is secured to the surface of the plank or board in order to retain the heating channels and cables in place. An extension cable end 38 of the heating cable 26 is extended through an appropriate slot or aperture 39 in the end cover 24 and is provided with a plug fitting (not shown) for engagement in an electrical outlet (not shown).

In use, the electrically heated planks 10 are secured in place on a deck or floor frame to form a deck or platform, or are constructed as benches or seats such as may be used adjacent to a hot tub. The planks are secured in the usual manner with appropriate screws to form the desired decking or seating.

While a certain illustrative embodiment of the present invention is shown in the drawings and described above in detail, it should be understood that there is no intention to limit the invention to the specific structure disclosed. On the contrary, the intention is to cover all modifications, alternative constructions, equivalents and uses falling within the spirit and scope of the invention as expressed in the appended claims.

I claim:
1. A heating panel comprising, in combination,
an electric heating cable for supplying heat;
an extruded elongated heat conducting metallic beam defining a longitudinally extending channel in which said cable is received;
an elongated board made from a material resistant to deterioration as a result of exposure to heat and sunlight, said board defining a longitudinally extending channel in which said beam is received; and,
an insulation sheet covering said board channel to completely enclose said beam and cable enhance heat transfer from said cable through said beam to said board.

2. A heating panel as defined in claim 1, wherein said beam defines a plurality of channels for receiving therein said cable.

3. A heating panel has defined in claim 1, wherein said beam defines a pair of spaced apart channels for receiving therein said cable.

4. A heating panel as defined in claim 1, wherein said cable is a self regulating electric heating cable.

5. A heating panel has defined in claim 1, wherein said beam is an aluminum or aluminum alloy extrusion.

6. A heating panel has defined in claim 1, wherein said beam defines a central, wide, inner channel opening in one direction and a pair of narrower side channels one on each side of said central channel and opening in a direction opposite to the direction of opening of said inner channel.

7. A heating panel as defined in claim 1, wherein the said beam defines opposed longitudinally extending fins extending over said inner channel.

8. A heating panel as defined in claim 1, further comprising a plurality of heated planks.

9. A heating panel has defined in claim 1, further comprising at least two heated planks.

10. A heating panel has defined in claim 1, wherein said plank is of a material selected from the group consisting of recycled plastic and wood plastic composite.

11. A heating panel as defined in claim 1, further comprising a cover panel covering said insulating sheet, beam, and plank channel.

12. A heating panel as defined in claim 1, wherein said heat conducting beam comprises:
an elongated channel defining a pair of spaced upstanding legs having upper and lower edges and joined at their lower edges by a transverse web,
a pair of inverted L-shaped longitudinally extending angles defining a horizontal arm and depending vertical arm normal thereto,
the horizontal arm of each said angle being joined to a corresponding upstanding leg of said channel with said depending arms defining with said legs downwardly opening narrow channels, and with said horizontal arms substantially covering said elongated channel.

13. A heating panel has defined in claim 1, wherein said elongated channel extends the length of said plank and opens into the end walls thereof, and further comprising end panels covering the end walls of said plank.

14. A heating panel as defined in claim 1 wherein said plank is formed of recycled plastic material.

15. A heating panel as defined in claim 1 wherein said plank is formed of a wood and polymer matrix material.

16. A heated deck comprising:
a plurality of longitudinally extending heating planks extending in side-by-side relation, each said heating plank comprising:

an electric heating cable for supplying heat;

an extruded elongated heat conducting metallic beam defining a longitudinally extending channel in which said cable is received;

an elongated plank made from a material resistant to deterioration as a result of exposure to heat and sunlight, said plank defining a longitudinally extending channel in which said beam is received; and, an insulation sheet covering said plank channel to completely enclose said beam and cable to enhance heat transfer from said cable through said beam to said plank.

17. A method of heating decking and seating formed of longitudinally extending heating planks comprising the steps of:

providing a plurality of heating planks wherein each said heating plank includes an electric heating cable for supplying heat, an extruded elongated heat conducting metallic beam defining a longitudinally extending channel in which said cable is received, an elongated plank made from a material resistant to deterioration as a result of exposure to heat and sunlight, said plank defining a longitudinally extending channel in which said beam is received, and an insulation sheet covering said plank channel to completely enclose said beam and cable to enhance heat transfer from said cable through said beam to said plank; and, energizing said cable to heat each said beam and plank.

* * * * *